United States Patent
Xie et al.

(10) Patent No.: US 12,134,194 B2
(45) Date of Patent: Nov. 5, 2024

(54) ROBOT BALANCE CONTROL METHOD, ROBOT CONTROLLER AND COMPUTER READABLE STORAGE MEDIUM

(71) Applicant: UBTECH ROBOTICS CORP LTD, Shenzhen (CN)

(72) Inventors: Yan Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 314 days.

(21) Appl. No.: 17/710,949

(22) Filed: Mar. 31, 2022

(65) Prior Publication Data

US 2022/0379470 A1 Dec. 1, 2022

Related U.S. Application Data

(63) Continuation of application No. PCT/CN2021/131677, filed on Nov. 19, 2021.

(30) Foreign Application Priority Data

May 26, 2021 (CN) .......................... 202110579167.8

(51) Int. Cl.
  *B25J 9/16* (2006.01)
  *B62D 57/032* (2006.01)

(52) U.S. Cl.
  CPC .......... *B25J 9/1664* (2013.01); *B25J 9/1607* (2013.01); *B25J 9/1633* (2013.01); *B25J 9/1653* (2013.01); *B62D 57/032* (2013.01)

(58) Field of Classification Search
  CPC ...... B25J 9/1664; B25J 9/1607; B25J 9/1633; B25J 9/1653; B62D 57/032
  See application file for complete search history.

(56) References Cited

U.S. PATENT DOCUMENTS

| | | | | |
|---|---|---|---|---|
| 2007/0220637 A1* | 9/2007 | Endo | ...................... | G06N 3/008 318/568.17 |
| 2012/0316684 A1* | 12/2012 | Lee | ......................... | G06N 3/008 901/1 |
| 2013/0144441 A1* | 6/2013 | Kanazawa | ............. | B25J 9/1607 700/263 |

FOREIGN PATENT DOCUMENTS

| | | |
|---|---|---|
| CN | 111872941 A | 11/2020 |
| CN | 112775976 A | 5/2021 |

OTHER PUBLICATIONS

ISR for PCT/CN2021/131677.
Written opinions of ISA for PCT/CN2021/131677.

* cited by examiner

*Primary Examiner* — Adam R Mott
*Assistant Examiner* — Ricardo I Viscarra

(57) ABSTRACT

A robot balance control method, a controller, and a computer readable storage medium are provided. The method includes: obtaining a desired motion trajectory matching a current motion status by performing a parameter adaptation adjustment on a current planned motion trajectory; determining, according to the motion status, a desired state parameter of each of soles, a centroid, and a waist of a humanoid robot for conforming to the desired motion trajectory; calculating, based on the motion status and the desired state parameter of each of the soles, the centroid, and the waist of the humanoid robot, a desired driving parameter of the humanoid robot for simultaneously meeting a robot dynamics requirement, a sole control requirement, a centroid control requirement, a waist control requirement, and force control parameter distribution constraint(s) at the current moment; and controlling, based on the desired driving parameter, a movement of the humanoid robot.

20 Claims, 7 Drawing Sheets

S221 — Calculate a zero torque point position of each of the two feet of the humanoid robot based on a sole force of the two feet in the motion status at the current moment S222 — Determine whether the zero torque point position of each of the two feet of the humanoid robot is within a range of a sole supporting area of the corresponding foot S223 — For the foot of the humanoid robot having the zero torque point position within the range of the sole supporting area of the corresponding foot, obtain a desired sole pose and a desired sole speed in the desired motion trajectory by performing a matching replacement on a planned sole pose and a planned sole speed in the planned motion trajectory using a sole pose and a sole speed in the motion status that correspond to the foot S224 — For the foot of the humanoid robot having the zero torque point position not within the range of the sole supporting area of the corresponding foot, take the planned sole pose of the foot in the planned motion trajectory as the desired sole pose of the foot in the desired motion trajectory and the planned sole speed of the foot in the planned motion trajectory as the desired sole speed of the foot in the desired motion trajectory S225 — Obtain a desired centroid pose in the desired motion trajectory by performing parameter updating on a planned centroid pose in the planned motion trajectory using the desired sole pose of the feet of the humanoid robot S226 — Obtain a desired centroid speed in the desired motion trajectory by performing parameter updating on a planned centroid speed in the planned motion trajectory using the desired sole speed of the feet of the humanoid robot S227 — Obtain a desired waist pose and a desired waist speed in the desired motion trajectory by setting a planned waist pose and a planned waist speed in the planned motion trajectory to zero S228 — Obtain a desired sole force parameter of each of the two feet in the desired motion trajectory by performing parameter updating on a planned sole force parameter of each of the two feet in the planned motion trajectory using a gravity of the humanoid robot

FIG. 3

Obtain a first optimized driving parameter in a first null space by substituting the motion status into a floating base dynamics equation corresponding to the robot dynamics requirement and a joint torque inequality corresponding to the joint torque distribution constraint condition in the first null space to perform a first convex quadratic programming problem solving on a to-be-optimized driving parameter — S241

Calculate a first to-be-recursed driving parameter of a second null space based on a null space projection matrix of the first null space, a first free vector of the second null space, and the first optimized driving parameter — S242

Obtain a second optimized driving parameter in the second null space by substituting the first to-be-recursed driving parameter into a first associative relationship expression corresponding to the sole control requirement(s), the joint torque inequality, and a sole force parameter inequality group corresponding to the sole force parameter distribution constraint in the second null space — S243

Calculate a second to-be-recursed driving parameter of the third null space based on a null space projection matrix of the second null space, a second free vector of the third null space, and the second optimized driving parameter — S244

Obtain a third optimized driving parameter in the third null space by substituting the second to-be-to-be-recursed driving parameter into a second associative relationship expression corresponding to the centroid control requirement, the joint torque inequality, and the sole force parameter inequality group to perform a second convex quadratic programming problem solving in the third null space — S245

Calculate a first to-be-recursed driving parameter of a second null space based on a null space projection matrix of the first null space, a first free vector of the second null space, and the first optimized driving parameter — S246

Obtain a to-be-outputted driving parameter capable of being used as the desired driving parameter in the fourth null space by substituting the third to-be-to-be-recursed driving parameter into a third associative relationship expression corresponding to the waist control requirement, a desired sole force parameter trend equation corresponding to the sole control requirement(s), the joint torque inequality, and the sole force parameter inequality group to perform a third convex quadratic programming problem solving in the fourth null space — S247

FIG. 5

Use the obtained to-be-outputted driving parameter in the fourth null space as the desired driving parameter, in response to the convex quadratic programming problem solving corresponding to each of the first null space, the second null space, the third null space, and the fourth null space being all performed successfully and a total time consuming of the convex quadratic programming problem solving corresponding to the first null space, the second null space, the third null space, and the fourth null space being less than a duration of the current control cycle — S248

Use a used driving parameter corresponding to a previous control cycle of the current control cycle as the desired driving parameter, in response to the convex quadratic programming problem solving corresponding to any of the first null space, the second null space, the third null space and the fourth null space being performed failed or the total time consuming of the convex quadratic programming problem solving corresponding to the first null space, the second null space, the third null space, and the fourth null space being greater than the duration of the current control cycle — S249

FIG. 6

ROBOT BALANCE CONTROL METHOD, ROBOT CONTROLLER AND COMPUTER READABLE STORAGE MEDIUM

CROSS REFERENCE TO RELATED APPLICATIONS

The present disclosure is a continuation-application of International Application PCT/CN2021/131677, with an international filing date of Nov. 19, 2021, which claims foreign priority of Chinese Patent Application No. 202110579167.8, filed on May 26, 2021 in the State Intellectual Property Office of China, the contents of all of which are hereby incorporated by reference.

BACKGROUND

1. Technical Field

The present disclosure relates to robot control technology, and particularly to a robot balance control method, a robot controller, and a computer readable storage medium.

2. Description of Related Art

With the continuous development of technologies, robotic technology has received extensive attention from all walks of life because of its great worth in research and application. In which, humanoid robot is an important topic for the researches in robotic technology. For a humanoid robot, the premise of the humanoid robot to achieve its own walking and operating capabilities is that they can maintain balance in complex environments, and the balance control ability of the humanoid robot is the key factor for putting the humanoid robot into practice.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

FIG. 3 is a flow chart of sub-steps of step S220 of the method of FIG. 2.

FIG. 5 is a flow chart of the first example of sub-steps of step S240 of the method of FIG. 2.

FIG. 6 is a flow chart of the second example of sub-steps of step S240 of the method of FIG. 2.

DETAILED DESCRIPTION

Figure 1:
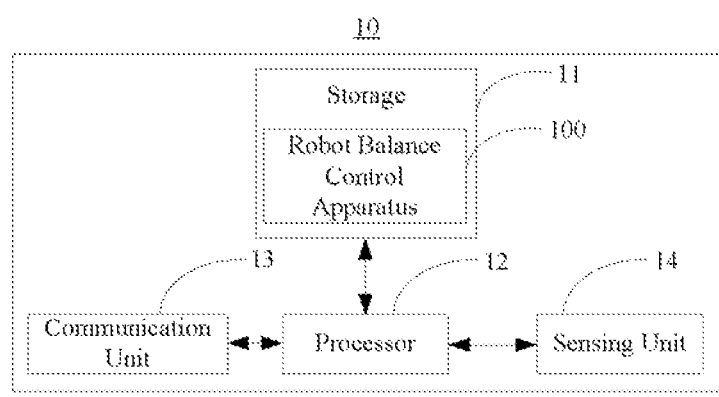
FIG. 1 is a schematic block diagram of the composition of a robot controller according to an embodiment of the present disclosure.

In order to make the objects, technical solutions and advantages of the embodiments of the present disclosure more clear, the technical solutions in the embodiments of the present disclosure will be clearly and completely described below with reference to the drawings in the embodiments of the present disclosure. Apparently, the described embodiments are part of the embodiments of the present disclosure, not all of the embodiments. The components of the embodiments of the present disclosure that are described and illustrated in the drawings herein may generally be arranged and designed in a variety of different configurations.

Therefore, the following detailed description of the embodiments of the present disclosure provided in the drawings is not intended to limit the scope of the present disclosure, but merely represent the selected embodiments of the present disclosure. Based on the embodiments in the present disclosure, all other embodiments obtained by those of ordinary skill in the art without creative work fall within the protection scope of the present disclosure.

It should be noted that, in the following figures, similar numerals and letters refer to similar items. Therefore, once an item is defined in one figure, it does not require further definition and explanation in subsequent figures.

In the description of the present disclosure, it is to be understood that relational terms such as "first" and "second" are used only to distinguish one entity or operation from another entity or operation, and do not necessarily require or imply the existence of any actual relationship or sequence between these entities or operations. Moreover, the terms "comprising", "including" or any other variation thereof are intended to encompass non-exclusive inclusion such that a process, method, article or apparatus (device) comprising a series of elements includes not only those elements, but also includes other elements not explicitly listed or inherent to the process, method, article or apparatus. Without further limitation, an element limited by the sentence "comprising a . . . " does not preclude the existence of additional identical elements in a process, method, article or apparatus that includes the element. For those of ordinary skill in the art, the specific meanings of the above-mentioned terms in the present disclosure can be understood according to the specific condition.

In the existing robot balance control scheme, it divides the overall balance control task into a plurality of control subtasks (e.g., ground force control, momentum control, and whole-body dynamics control), then uses the null space projection method to decouple each control subtask, so that the low-priority control subtask is in the null space of the high-priority control subtask to ensure that the low-priority control subtask does not affect the execution of the high-priority control subtask, thereby avoiding the control interferences between the plurality of control subtasks. However, this robot balance control scheme does not consider the influence of the interference of the environment (for example, the shaking or bumpy sole supporting plane) at which the robot is located on each control subtask, and also does not consider the operational safety restrictions of the robot itself, which resulting in that the final output control results often cannot achieve the expected motion balance effect.

In this case, to ensure that the humanoid robot can correct the planned motion trajectory of the robot in real time per the real motion conditions, reduce the interference of the environment at which the robot is located on the motion balance of the humanoid robot, and ensure that the body motion of the humanoid robot can achieve the desired motion balance effect while complying with the robot motion laws so as to improve the operation safety of the robot, the embodiments of the present disclosure provide a robot balance control method, apparatus, robot controller, and computer readable storage medium.

Some embodiments of the present disclosure will be described in detail below with reference to the drawings. The following embodiments and the features therein may be combined with each other while there is no confliction therebetween.

FIG. 1 is a schematic block diagram of the composition of a robot controller according to an embodiment of the present disclosure. As shown in FIG. 1, a robot controller 10 is provided. In this embodiment, the robot controller 10 is used to regulate the motion status of the humanoid robot so as to correct the planned motion trajectory of the humanoid robot in real time so that the corrected planned trajectory matches the real motion condition of the humanoid robot and reduces the disturbance of the environment at which the robot is located on the motion balance of the humanoid robot, and the body motions of the humanoid robot is ensured to achieve the desired motion balance effect while conforming to the robot motion laws by adjusting the joint operation states so as to improve the operation safety of the robot. In which, the robot controller 10 may be integrated with the humanoid robot, or be connected with the humanoid robot by remote communication.

In this embodiment, the humanoid robot may include an upper body, a hip joint driving structure, and two robotic leg structures. The two robotic leg structures are located on two sides of the hip joint driving structure, respectively, to connect with the hip joint driving structure. The upper body is connected with the hip joint driving structure, where the hip joint driving structure is connected to the upper body at the position between the two robotic leg structures. Two mutually orthogonal rotatable driving structures may be disposed at the positions of the hip joint driving structure that are connected to the robotic leg structure so as to realize the positional alternation between the two robotic leg structures, and each robotic leg structure is disposed with a rotatable driving structure for realizing the knee bending operations of the corresponding robotic leg structure at a knee joint of the robotic leg structure.

In this embodiment, the robot controller 10 may include a robot balance control apparatus 100, a storage 11, a processor 12, a communication unit 13, and a sensing unit 14. The storage 11, the processor 12, the communication unit 13 and sensing unit 14 are directly or indirectly electrically connected to each other to realize data transmission or interaction. For example, the components of the storage 11, the processor 12, the communication unit 13 and sensing unit 14 may be electrically connected to each other through one or more communication buses or signal lines.

In this embodiment, the storage 11 may be, but not limited to, a random access memory (RAM), a read only memory (ROM), a programmable read only memory (PROM), erasable programmable read-Only memory (EPROM), electrical erasable programmable read-only memory (EEPROM), or the like. In which, the storage 11 is used for storing computer programs, and the processor 12 can execute the computer programs correspondingly after receiving execution instructions.

In this embodiment, the processor 12 may be an integrated circuit chip with signal processing capability. The processor 12 may be a general purpose processor including at least one of a central processing unit (CPU), a graphics processing unit (GPU), a network processor (NP), a digital signal processor (DSP), an application specific integrated circuit (ASIC), a field-programmable gate array (FPGA) or other programmable logic devices, discrete gate, transistor logic device, and discrete hardware component. The general purpose processor may be a microprocessor or the processor may also be any conventional processor that may implement or execute the methods, steps, and the logical block diagrams disclosed in the embodiments of the present disclosure.

In this embodiment, the communication unit 13 is configured to establish a communication connection between the robot controller 10 and other electronic devices through a network, and send/receive data through the network, where the network includes a wired communication and a wireless communication network. For example, the robot controller 10 may obtain the planned motion trajectory for the humanoid robot from a task planning device through the communication unit 13, and send motion control instructions to the humanoid robot through the communication unit 13, so that the humanoid robot moves according to the motion control instructions. The planned motion trajectory is a pre-planned motion trajectory for the humanoid robot.

In this embodiment, the sensing unit 14 is configured to detect the motion status of the humanoid robot, for example, to monitor the actual angular velocity at each joint (including each joint of the robot and each virtual joint for describing the pose of the waist of the robot), to monitor the sole forces (i.e., forces received by the soles) of the soles of the two feet of the humanoid robot which is for representing the force parameters of the real sole, and monitor the actual pose and actual speed of each body part (e.g., the waist, the sole and the centroid (center of mass)) of the humanoid robot.

In this embodiment, the balance control apparatus 100 may include at least one software function module that can be stored in the storage 11 or in the operating system of the robot controller 10 in the form of software or firmware. The processor 12 may be configured to execute executable modules such as software function modules and computer programs included in the balance control apparatus 100 that are stored in the storage 11. The balance control apparatus 100 may correct a planned robot motion trajectory in real-time according to the real motion status of the robot, reduce the interference of the environment at which the robot is located on the motion balance of the humanoid robot, and ensure that the body motion of the humanoid robot achieves the desired motion balance effect while conforming to the robot motion laws, thereby improving the operation safety of the robot.

It can be understood that, the composition of the robot controller 10 in FIG. 1 is only an example, and the robot controller 10 may still include more or less elements than those shown in FIG. 1, or have a different configuration from that shown in FIG. 1. Each of the elements shown in FIG. 1 may be implemented in hardware, software, or a combination thereof.

In the present disclosure, to ensure that the robot controller 10 can correct the planned robot motion trajectory in real-time according to the real motion status of the robot, and ensure that the body motion of the humanoid robot can achieve the desired motion balance effect while complying with the robot motion laws so as to improve the operation safety of the robot, a robot balance control method applied to the above-mentioned robot controller 10 is provided. The robot balance control method provided by the present disclosure will be described in detail below.

Figure 2:
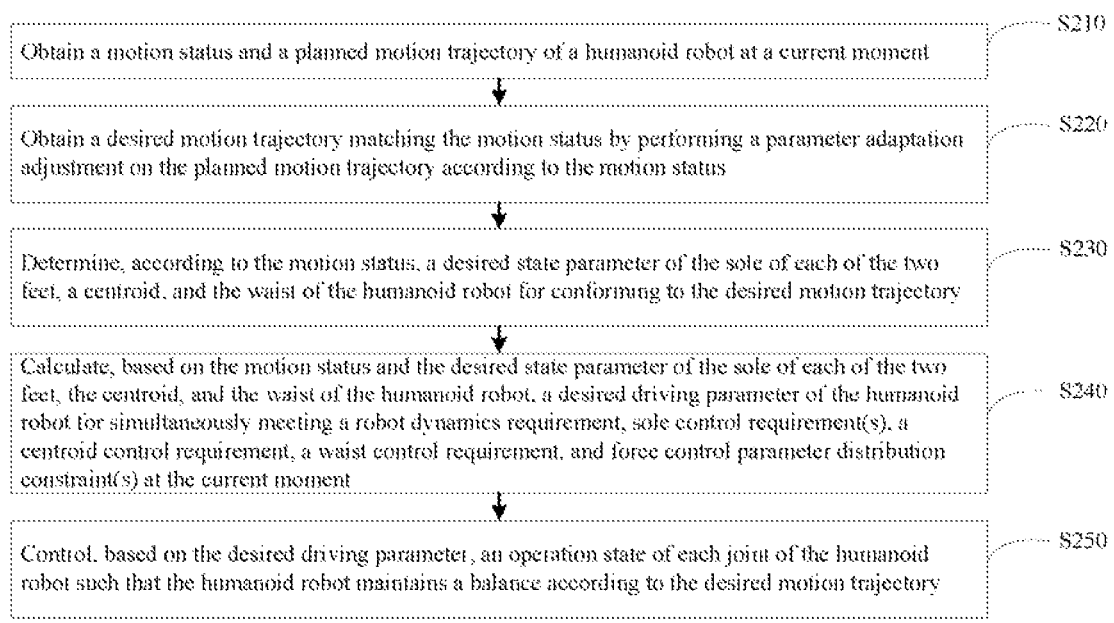
FIG. 2 is a flow chart of a robot balance control method according to an embodiment of the present disclosure.

FIG. 2 is a flow chart of the robot balance control method according to an embodiment of the present disclosure. In this embodiment, the robot balance control method is a computer-implemented method executable for a processor of (the above-mentioned robot controller 10 of) the above-mentioned humanoid robot. The method may be implemented through the robot controller 10 shown in FIG. 1 or a robot balance control apparatus shown in FIG. 7. The humanoid robot may include a waist (including the hip joint driving structure) and two feet (i.e., a left foot and a right foot), where each of the two feet has a sole. As shown in FIG. 1, the method may include the following steps.

S210: obtaining a motion status and a planned motion trajectory of the humanoid robot at a current moment.

In this embodiment, when the robot controller 10 controls the humanoid robot to move, the supporting leg for supporting the humanoid robot to maintain a standing state that is currently in contact with a sole supporting plane (of the ground at which the humanoid robot stands) will be determined, then an acting point of the supporting surface that contacts with the supporting leg will be used as the origin of a world coordinate system to create a Cartesian coordinate system to describe the motion status of the humanoid robot. In which, the positive direction of the X-axis in the created Cartesian coordinate system generally represents the forward direction of the humanoid robot, and the positive direction of the Z-axis in the Cartesian coordinate system is perpendicular to and in upward of the sole supporting plane. Therefore, the robot controller 10 can detect the currently corresponding motion status of the humanoid robot in the Cartesian coordinate system through the sensing unit 14.

In which, the motion status may include the sole forces (including a real sole force vector and a real sole torque vector) of the two feet of the humanoid robot, the current actual poses and actual speeds of the humanoid robot at the sole, the centroid, and the waist, and the actual velocity and the actual angular velocity of the humanoid robot at each joint (including each joint of the robot and each virtual joint for describing the pose of the waist of the robot).

S220: obtaining a desired motion trajectory matching the motion status by performing a parameter adaptation adjustment (e.g., parameter updating) on the planned motion trajectory according to the motion status.

In this embodiment, after the robot controller 10 obtains the current motion status of the humanoid robot and the planned motion trajectory that needs to be conformed to at present, it will perform the adaptive adjustment of the related parameters on the planned motion trajectory according to the current motion status, and take the adjusted planned motion trajectory as the desired motion trajectory that matches the current motion status, so that the humanoid robot can move according to the desired motion trajectory while reducing the interference of the environment at which the robot is located to the motion balance of the humanoid robot.

FIG. 3 is a flow chart of sub-steps of step S220 of the method of FIG. 2. As shown in FIG. 3, in this embodiment, the robot controller 10 may determine the contact of the feet of the humanoid robot with the sole supporting plane in the current environment by analyzing the current motion status of the humanoid robot, and further adjust the parameters of the current planned motion trajectory based on the contact of the feet of the humanoid robot with the sole supporting plane so as to obtain the desired motion trajectory adapted to the motion status. To this end, the robot controller 10 may implement the forgoing functions by executing sub-steps S221-S228 shown in FIG. 3 of step S220.

S221: calculating a zero torque point position of each of the two feet of the humanoid robot based on a sole force of the two feet in the motion status at the current moment.

In this embodiment, the sole force of the two feet includes the real sole force of the left foot and the right foot of the humanoid robot. In which, the real sole force includes the component of the real sole force vector of the corresponding foot in the X-axis, Y-axis and Z-axis directions of the Cartesian coordinate system, and the component of the real sole torque vector of the corresponding foot in the X-axis, Y-axis and Z-axis directions of the Cartesian coordinate system. The robot controller 10 may calculate the current zero torque point positions (i.e., the current positions of the zero torque points) for the left foot and the right foot, respectively, using equations of:

$$\begin{cases} x_{ZMP} = (-T_y - F'_x d)/F'_z \\ y_{ZMP} = -(T_x - F'_y d)/F'_z \end{cases};$$

where, $x_{ZMP}$ represents the coordinate of the zero torque point of the corresponding foot in the X-axis direction of the Cartesian coordinate system, $y_{ZMP}$ represents the coordinate of the zero torque point of the corresponding foot in the Y-axis direction of the Cartesian coordinate system, $F'_x$ represents the component of the real sole force vector of the corresponding foot in the X-axis direction of the Cartesian coordinate system, $F'_y$ represents the component of the real sole force vector of the corresponding foot in the Y-axis direction of the Cartesian coordinate system, $F'_z$ represents the component of the real sole force vector of the corresponding foot in the Z-axis direction of the Cartesian coordinate system, $T_y$ represents the component of the real sole torque vector of the corresponding foot in the Y-axis direction of the Cartesian coordinate system, $T_x$ represents the component of the real sole torque vector of the corresponding foot in the X-axis direction of the Cartesian coordinate system, and d represents the vertical distance between the center of the sensing unit 14 and the sole of the corresponding foot.

S222: determining whether the zero torque point position of each of the two feet of the humanoid robot is within a range of a sole supporting area of the corresponding foot.

In this embodiment, the sole supporting area is used to represent the smallest polygon area formed by the contact points between the surface of the sole of the corresponding foot of the humanoid robot and the sole supporting plane. After determining the positions of the current zero torque points of the left and right feet of the humanoid robot, respectively, the robot controller 10 will accordingly determine the ranges of the sole supporting areas correspond to the left foot and the right foot of the humanoid robot, respectively, according to the current positions of the soles of the left foot and the right foot, respectively, then determine whether the zero torque point position of each of the left foot and the right foot is within the range of the current sole supporting area.

S223: for the foot of the humanoid robot having the zero torque point position within the range of the sole supporting area of the corresponding foot, obtaining a desired sole pose and a desired sole speed in the desired motion trajectory by performing a matching replacement on a planned sole pose and a planned sole speed in the planned motion trajectory using a sole pose and a sole speed in the motion status that correspond to the foot.

In this embodiment, if the zero torque point position of one of the left and right feet of the humanoid robot is within the range of the corresponding sole supporting area, the desired sole pose of the foot in the desired motion trajectory may be obtained by replacing the planned sole pose in the planned motion trajectory directly using the real sole pose in the current motion status that corresponds to the foot, and the desired sole speed of the foot in the desired motion trajectory may be obtained by replacing the planned sole speed in the planned motion trajectory directly using the real sole speed in the current motion status that corresponds to the foot.

S224: for the foot of the humanoid robot having the zero torque point position not within the range of the sole supporting area of the corresponding foot, taking the planned sole pose of the foot in the planned motion trajectory as the desired sole pose of the foot in the desired motion trajectory and the planned sole speed of the foot in the planned motion trajectory as the desired sole speed of the foot in the desired motion trajectory.

In this embodiment, if the zero torque point position of one of the left and right feet of the humanoid robot is not within the range of the corresponding sole supporting area, the planned sole pose in the current planned motion trajectory of the foot may be directly taken as the desired sole pose of the foot in the desired motion trajectory, and the planned sole speed in the current planned motion trajectory of the foot may be directly taken as the desired sole speed of the foot in the desired motion trajectory.

S225: obtaining a desired centroid pose in the desired motion trajectory by performing parameter updating on a planned centroid pose in the planned motion trajectory using the desired sole pose of the feet of the humanoid robot.

In this embodiment, the associative relationship between a desired pose of the centroid in the desired motion trajectory and a desired pose of the sole of the feet of the humanoid robot may be expressed using equations of:

$$\begin{cases} r_{COM,ref}(x, y) = (r_{LF,ref}(x, y) + r_{RF,ref}(x, y))/2 \\ r_{COM,ref}(z) = (r_{LF,ref}(z) + r_{RF,ref}(z))/2 + \text{Constant} \end{cases};$$

where, $r_{COM,ref}(x,y)$ represents the coordinate of the position of the desired pose of the centroid in the X-axis and Y-axis directions of the Cartesian coordinate system, $r_{LF,ref}(x,y)$ represents the coordinate of the position of the desired pose of the sole of the left foot of the humanoid robot in the X-axis and Y-axis directions of the Cartesian coordinate system, $r_{RF,ref}(x,y)$ represents the coordinate of the position of the desired pose of the sole of the right foot of the humanoid robot in the X-axis and Y-axis directions of the Cartesian coordinate system, $r_{COM,ref}(z)$ represents the coordinate of the position of the desired pose of the centroid in the Z-axis direction of the Cartesian coordinate system, $r_{LF,ref}(z)$ represents the coordinate of the position of the desired pose of the sole of the left foot of the humanoid robot in the Z-axis direction of the Cartesian coordinate system, $r_{RF,ref}(z)$ represents the coordinate of the position of the desired pose of the sole of the right foot of the humanoid robot in the Z-axis direction of the Cartesian coordinate system, and Constant represents the fixed position offset.

Therefore, the robot controller 10 may use the forgoing equations to update the parameters of the planned centroid pose in the planned motion trajectory, thereby obtaining the matched desired pose of the centroid in the corresponding desired motion trajectory.

S226: obtaining a desired centroid speed in the desired motion trajectory by performing parameter updating on a planned centroid speed in the planned motion trajectory using the desired sole speed of the feet of the humanoid robot.

In this embodiment, the associative relationship between the desired centroid speed in the desired motion trajectory and the desired sole speed of the feet of the humanoid robot may be expressed using an equation of:

$$v_{COM,ref} = (v_{LF,ref} + v_{RF,ref})/2;$$

where, $v_{COM,ref}$ represents the desired centroid speed, $v_{LF,ref}$ represents the desired sole speed of the left foot of the humanoid robot, and $v_{RF,ref}$ represents the desired sole speed of the right foot of the humanoid robot.

Therefore, the robot controller 10 may use the forgoing equation to update the parameters of the planned centroid velocity in the planned motion trajectory, thereby obtaining the matched desired centroid speed in the corresponding desired motion trajectory.

S227: obtaining a desired waist pose and a desired waist speed in the desired motion trajectory by setting a planned waist pose and a planned waist speed in the planned motion trajectory to zero.

S228: obtaining a desired sole force parameter of each of the two feet in the desired motion trajectory by performing parameter updating on a planned sole force parameter of each of the two feet in the planned motion trajectory using a gravity of the humanoid robot.

In this embodiment, the component of a planned sole force vector included in the planned sole force parameter of the left foot that is in the planned motion trajectory in the Z-axis direction of the Cartesian coordinate system may be set as half the gravity of the humanoid robot, and the component of a planned sole force vector included in the planned sole force parameter of the right foot that is in the planned motion trajectory in the Z-axis direction of the Cartesian coordinate system may be set as half the gravity of the humanoid robot, and then the planned sole force parameter of each of the left and right feet that is remained in the planned motion trajectory are retained to obtain the desired sole force parameter of each of the two feet in the desired motion trajectory.

Therefore, the present disclosure can determine the contact status of the two feet of the humanoid robot with the sole supporting plane in the current environment by executing the above-mentioned sub-steps S221-S228, and obtain the desired motion trajectory adapted to the motion status by adjusting the parameters of the current planned motion trajectory based on the contact status of the supporting surface of the feet of the robot, so as to achieve the real-time correction of the planned robot motion trajectory and reduce the influence of the environment at which the robot is located to the motion balance of the humanoid robot.

S230: determining, according to the motion status, a desired state parameter of the sole of each of the two feet, a centroid, and the waist of the humanoid robot for conforming to the desired motion trajectory.

In this embodiment, after determining the desired motion trajectory currently matching the motion status, the robot controller 10 will correspondingly determine the difference between the motion status corresponding to each of the soles, the centroid and the waist and the desired motion trajectory, thereby determining the desired state parameter required for each of the soles, the centroid and the waist to achieve the motion balance effect matching the current desired motion trajectory.

In which, the desired state parameters may include a desired accelerations of the sole of the feet, a desired linear power of the centroid, and a desired acceleration of the waist. The desired acceleration of the sole needs to be calculated using a planned state parameter (i.e., a planned acceleration of the sole) of the sole that is included in the planned motion trajectory, the desired linear power of the centroid needs to be calculated using a planned state parameter (i.e., a planned linear power of the centroid) of the centroid that is included in the planned motion trajectory, and the desired acceleration of the waist needs to be calculated using a planned state parameter (i.e., a planned acceleration of the waist) of the waist that is included in the planned motion trajectory.

Figure 4:
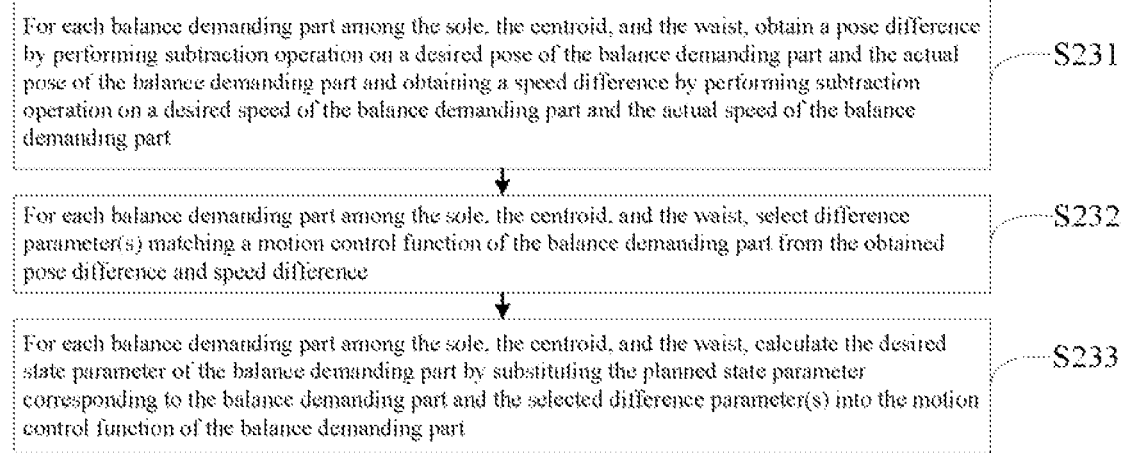
FIG. 4 is a flow chart of sub-steps of step S230 of the method of FIG. 2.

FIG. 4 is a flow chart of sub-steps of step S230 of the method of FIG. 2. As shown in FIG. 4, in this embodiment, step S230 may include sub-steps S231-S233 which determine the desired state parameter corresponding to each of the sole, the centroid and the waist of the humanoid robot for the desired motion trajectory that conforms to the robot control laws.

S231: for each balance demanding part among the sole, the centroid, and the waist, obtaining a pose difference by performing subtraction operation on a desired pose of the balance demanding part and the actual pose of the balance demanding part and obtaining a speed difference by performing subtraction operation on a desired speed of the balance demanding part and the actual speed of the balance demanding part.

In this embodiment, for the three balance demanding parts of the foot, the centroid and the waist, the robot controller 10 will calculate, for each of the balance demanding parts, the difference between the desired pose at the current moment and the obtained actual pose, and the difference between the desired speed at the current moment and the obtained actual speed. That is, the desired pose and actual pose of the balance demanding part are subtracted to obtain the corresponding pose difference, and the desired speed and actual speed of the balance demanding part are subtracted to obtain the corresponding speed difference.

S232: for each balance demanding part among the sole, the centroid, and the waist, selecting difference parameter(s) matching a motion control function of the balance demanding part from the obtained pose difference and speed difference.

In this embodiment, the motion control function is used to adjust the motion condition of the corresponding balance demanding part to an expected condition. The principles of the control algorithms of the motion control functions corresponding to different balance demanding parts may be the same or different. For example, the motion control function for the soles may use any one of PID control algorithm, PI control algorithm, PD control algorithm, and P control algorithm, and the motion control function for the centroid may use any one of PID control algorithm, PI control algorithm, PD control algorithm, and P control algorithm, and the motion control function for the waist may also use any one of PID control algorithm, PI control algorithm, PD control algorithm, and P control algorithm.

In which, different motion control functions for the same balance demanding part may also use different calculation parameters to perform related operations of the desired state parameter due to the different algorithm principles involved. Therefore, after determining the pose difference and speed difference of the sole, the centroid or the waist at the current moment, the robot controller 10 will select the difference parameter(s) involved in the motion control function from the determined pose difference and speed difference according to the currently selected motion control function.

In this embodiment, as an example, if the motion control function of the sole is implemented based on the PD control algorithm, the difference parameter(s) involved in the motion control function will include the pose difference and the speed difference. At this time, the motion control function may be expressed using an equation of:

$$a_{F,d} = a'_{F,ref} + K_{p,F}(r_{F,\Delta}) + K_{d,F}(v_{F,\Delta});$$

if the motion control function of the sole is implemented based on the PID control algorithm, the difference parameter(s) involved in the motion control function will include the pose difference and the speed difference. At this time, the motion control function may be expressed using an equation of:

$$a_{F,d} = a'_{F,ref} + K_{p,F}(r_{F,\Delta}) + K_{d,F}(v_{F,\Delta}) + K_{i,F}\Sigma r_{F,\Delta};$$

if the motion control function of the sole is implemented based on the PI control algorithm, the difference parameter(s) involved in the motion control function will include the pose difference. At this time, the motion control function may be expressed using an equation of:

$$a_{F,d} = a'_{F,ref} + K_{p,F}(r_{F,\Delta}) + K_{i,F}\Sigma r_{F,\Delta};$$

if the motion control function of the sole is implemented based on the P control algorithm, the difference parameter(s) involved in the motion control function will include the pose difference. At this time, the motion control function may be expressed using an equation of:

$$a_{F,d} = a'_{F,ref} + K_{p,F}(r_{F,\Delta});$$

where, $a_{F,d}$ represents the desired acceleration of the sole, $a'_{F,ref}$ represents the planned acceleration of the sole in the planned motion trajectory, $K_{p,F}$ represents the control coefficient of a sole proportional control stage, $K_{i,F}$ represents the control coefficient of a sole integral control stage, $K_{d,F}$ represents the control coefficient of a sole differential control stage, $r_{F,\Delta}$ represents the pose difference of the sole, and $v_{F,\Delta}$ represents the speed difference of the sole.

In this embodiment, as an example, if the motion control function of the centroid is implemented based on the PD control algorithm, the difference parameter(s) involved in the motion control function may include the pose difference and the speed difference. At this time, the motion control function may be expressed using an equation of:

$$\hat{h}_{l,d} = \hat{h}'_{l,ref} + K_{p,C}(r_{C,\Delta}) + K_{d,C}(v_{C,\Delta});$$

if the motion control function of the centroid is implemented based on the PID control algorithm, the difference parameter(s) involved in the motion control function may include the pose difference and the speed difference. At this time, the motion control function may be expressed using an equation of:

$$\hat{h}_{l,d} = \hat{h}'_{l,ref} + K_{p,C}(r_{C,\Delta}) + K_{d,C}(v_{C,\Delta}) + K_{i,C}\Sigma r_{C,\Delta};$$

if the motion control function of the centroid is implemented based on the PI control algorithm, the difference parameter(s) involved in the motion control function may include the pose difference. At this time, the motion control function may be expressed using an equation of:

$$\hat{h}_{l,d} = \hat{h}'_{l,ref} + K_{p,C}(r_{C,\Delta}) + K_{i,C}\Sigma r_{C,\Delta};$$

if the motion control function of the centroid is implemented based on the P control algorithm, the difference parameter(s) involved in the motion control function may include the pose difference. At this time, the motion control function may be expressed using an equation of:

$$\hat{h}_{l,d} = \hat{h}'_{l,ref} + K_{p,C}(r_{C,\Delta});$$

where, $\hat{h}'_{l,d}$ represents the desired linear power of the centroid, $\hat{h}'_{l,ref}$ represents the planned linear power of the centroid in the planned motion trajectory (its value is $\hat{h}'_{l,ref}=ma'_{c,ref}$, where $a'_{c,ref}$ represents the planned acceleration of the centroid in the planned motion trajectory, and m represents the mass of the humanoid robot), $K_{p,C}$ represents the control coefficient of a centroid proportional control stage, $K_{i,C}$ represents the control coefficient of a centroid integral control stage, $K_{d,C}$ represents the control coefficient of a centroid differential control stage, $r_{C,\Delta}$ represents the pose difference of the centroid, $v_{C,\Delta}$ represents the speed difference of the centroid.

In this embodiment, as an example, if the motion control function of the waist is implemented based on the PD control algorithm, the difference parameter(s) involved in the motion control function may include the pose difference and the speed difference. At this time, the motion control function may be expressed using an equation of:

$$a_{T,d}=a'_{T,ref}+K_{p,T}(r_{T,\Delta})+K_{d,T}(v_{T,\Delta});$$

if the motion control function of the waist is implemented based on the PID control algorithm, the difference parameter(s) involved in the motion control function may include the pose difference and the speed difference. At this time, the motion control function may be expressed using an equation of:

$$a_{T,d}=a'_{T,ref}+K_{p,T}(r_{T,\Delta})+K_{d,T}(v_{T,\Delta})+K_{i,T}\Sigma r_{T,\Delta};$$

if the motion control function of the waist is implemented based on the PI control algorithm, the difference parameter(s) involved in the motion control function may include the pose difference. At this time, the motion control function may be expressed using an equation of:

$$a_{T,d}=a'_{T,ref}+K_{p,T}(r_{T,\Delta})+K_{i,T}\Sigma r_{T,\Delta};$$

if the motion control function of the waist is implemented based on the P control algorithm, the difference parameter(s) involved in the motion control function may include the pose difference. At this time, the motion control function may be expressed using an equation of:

$$a_{T,d}=a'_{T,ref}+K_{p,T}(r_{T,\Delta});$$

where, $a_{T,d}$ represents the desired acceleration of the waist, $a'_{T,ref}$ represents the planned acceleration of the waist in the planned motion trajectory, $K_{p,T}$ represents the control coefficient of a waist proportional control stage, $K_{i,T}$ represents the control coefficient of a waist integral control stage, $K_{d,T}$ represents the control coefficient of a waist differential control stage, $r_{T,\Delta}$ represents the pose difference of the waist, and $v_{T,\Delta}$ represents the speed difference of the waist.

S233: for each balance demanding part among the sole, the centroid, and the waist, calculating the desired state parameter of the balance demanding part by substituting the planned state parameter corresponding to the balance demanding part and the selected difference parameter(s) into the motion control function of the balance demanding part.

In this embodiment, after determining the difference parameter(s) related to the matching of the motion control function corresponding to each of the three balance demanding parts of the above-mentioned sole, centroid, and waist at the current moment, the robot controller 10 will substitute the planned state parameter of the corresponding balance demanding part and the selected difference parameter(s) into the corresponding motion control function for parameter calculation so as to obtain the desired state parameter of the balance demanding part. In which, the motion control function may be designed with reference to the above-mentioned examples for the three balance demanding parts of the sole, the centroid and the waist.

Therefore, the present disclosure can determine the desired state parameters corresponding to the sole, the centroid and the waist of the humanoid robot, respectively, for the desired motion trajectory in accordance with the robot control laws by executing the above-mentioned sub-steps S231-S233.

S240: calculating, based on the motion status and the desired state parameter of the sole of each of the two feet, the centroid, and the waist of the humanoid robot, a desired driving parameter of the humanoid robot for simultaneously meeting a robot dynamics requirement, sole control requirement(s), a centroid control requirement, a waist control requirement, and force control parameter distribution constraint(s) at the current moment.

In this embodiment, after determining the desired state parameters of the humanoid robot currently corresponding to the sole, the centroid, and the waist, respectively, the robot controller 10 will determine the matched desired driving parameter to control the operation state of each joint of the humanoid robot in the view of component control that simultaneously meets the robot kinematics law, the sole control effect, the centroid control effect, the waist control effect, and the force control parameter distribution limitation effect related to the safe operation of the robot, so as to simultaneously meet the robot dynamics requirement, the sole control requirement(s), the centroid control requirement, the waist control requirement and the force control parameter distribution constraint(s) that are involved in the robot motion balance effect through the actual state of each joint after adjustment, thereby ensuring the body motions of the humanoid robot to achieve the desired motion balance effect while conforming to the robot motion laws, which improves the operation safety of the robot and realizes the motion balance of the robot.

In the following, the concept of null space projection and convex quadratic programming problem optimization will be introduced to obtain the instance of the desired driving parameter that conforms to the current desired motion trajectory and meets the robot dynamics requirement, sole control requirement(s), centroid control requirement, waist control requirement and force control parameter distribution constraint(s) will be described in detail. In which, the robot dynamics requirement may be represented by ensuring that body motions of the humanoid robot conform to the robot kinematics, and the sole control requirement(s) may be represented by ensuring that the sole of at least one of the feet of the humanoid robot does not leave the sole supporting plane, the centroid control requirement may be represented by ensuring that the humanoid robot does not tip over, the waist control requirement may be represented by ensuring that the humanoid robot can really restore its balance, and the force control parameter distribution constraint(s) are for representing the numerical distribution of the force control parameters required for realizing the safe operation of the robot. The force control parameter distribution constraint(s) may include a joint torque distribution constraint and a sole force parameter distribution constraint.

FIG. 5 is a flow chart of the first example of sub-steps of step S240 of the method of FIG. 2. As shown in FIG. 5, in this embodiment, step S240 may include sub-steps S241-S247 to calculate the desired driving parameter for ensuring the body motion of the humanoid robot to realize the desired motion balance effect and conform to the robot motion laws. In which, the desired driving parameter may be composed of the desired angular acceleration of each joint of the humanoid robot and a desired sole force parameter of the two feet of the humanoid robot. The desired sole force parameter may include the components of a desired sole force vector of the corresponding foot in the X-axis, Y-axis and Z-axis directions of the Cartesian coordinate system, the components of a desired sole torque vector of the corresponding foot in the X-axis, Y-axis and Z-axis directions of the Cartesian coordinate system.

S241: obtaining a first optimized driving parameter in a first null space by substituting the motion status into a floating base dynamics equation corresponding to the robot dynamics requirement and a joint torque inequality corresponding to the joint torque distribution constraint condition in the first null space to perform a first convex quadratic programming problem solving on a to-be-optimized driving parameter.

In this embodiment, the to-be-optimized driving parameter is a specific driving parameter type corresponding to the desired driving parameter, and the to-be-optimized driving parameter may be composed of the angular acceleration of each joint of the robot and the sole force parameter of the feet of the robot. A floating base dynamics equation corresponding to the robot dynamics requirement may be expressed using an equation of:

$$S_f M \ddot{q} + S_f C + S_f G = S_f J^T F;$$

where, $S_f$ represents a current floating base selection matrix of the humanoid robot, M represents a current inertia matrix of the humanoid robot, G represents a current gravity matrix of the humanoid robot, C represents a current nonlinear matrix of the humanoid robot that is generated by the centrifugal force and the Coriolis force, J represents a Jacobian matrix of a current sole force acting point of the humanoid robot, $\ddot{q}$ represents an angular acceleration of each joint that is included in the to-be-optimized driving parameter, and F represent a sole force parameter included in the to-be-optimized driving parameter. In which, M, G, and C may be calculated by the robot controller 10 according to the current motion status.

The joint torque inequality corresponding to the joint torque distribution constraints may be expressed by substituting into a full dynamics equation of the humanoid robot, where the full dynamics equation of the humanoid robot may be expressed using an equation of:

$$M\ddot{q} + C + G = S_a^T \tau + J^T F;$$

at this time, the joint torque inequality may be expressed using an equation of:

$$[\tau_{min} - S_a(C+G)] \leq S_a M \ddot{q} - S_a J^T F \leq [\tau_{max} - S_a(C+G)];$$

where, $\tau_{min}$ represents a lower limit of a joint torque of the humanoid robot, $\tau_{max}$ represents a upper limit of the joint torque of the humanoid robot, $S_a$ represents a drivable joint selection matrix of the humanoid robot, M represents a current inertia matrix of the humanoid robot, G represents a current gravity matrix of the humanoid robot, C represents a current nonlinear matrix of the humanoid robot that is generated by centrifugal force and Coriolis force, J represents a Jacobian matrix of a current sole force acting point of the humanoid robot, $\ddot{q}$ represents an angular acceleration of each joint that is included in the to-be-optimized driving parameter, and F represent a sole force parameter included in the to-be-optimized driving parameter.

Therefore, the robot controller 10 may substitute the current motion status into the floating base dynamics equation and the joint torque inequality in the first null space representing the robot dynamics requirement with the highest priority, then the QP (convex quadratic programming) problem corresponding to the two equations may be constructed with reference to the standard form of the convex quadratic programming problem, and then an open source QP solver may be used to solve the converted QP problem, thereby completing the preliminary optimization processing of the to-be-optimized driving parameter and obtaining the first optimized driving parameter in the first null space that meets the robot dynamics requirement and a part of the force control parameter distribution constraint(s).

In this process, the QP problem constructed in the first null space may be expressed using equations of:

$$\min_{x_1, v_1} \quad \|A_1 x_1 - b_1\|^2 + \|v_1\|^2$$
$$\text{s.t.} \quad D_1 x_1 - f_1 \leq v_1$$

where, $x_1$ represents the to-be-optimized parameter corresponding to the to-be-optimized driving parameter in the first null space, $v_1$ represents a slack variable in the first null space, $A_1$ represents a first task coefficient matrix of a control task corresponding to the first null space, $b_1$ represents a second task coefficient matrix of the control task corresponding to the first null space, $D_1$ represents a first bias influence coefficient of a joint torque inequality in the QP problem, $f_1$ represents a second bias influence coefficient of the joint torque inequality in the QP problem, and $\|\cdot\|^2$ represents a vector two-norm.

S242: calculating a first to-be-recursed driving parameter of a second null space based on a null space projection matrix of the first null space, a first free vector of the second null space, and the first optimized driving parameter.

In this embodiment, the parameter association of the first to-be-recursed driving parameter of the second null space with the null space projection matrix of the first null space, the first free vector of the second null space, and the first optimized driving parameter may be expressed using an equation of:

$$x_2 = x^*_1 + N_1 u_2;$$

where, $x_2$ represents the first to-be-recursed driving parameter in the second null space, $N_1$ represents the null space projection matrix of the first null space, $x^*_1$ represents the first optimized driving parameter, and $u_2$ represents the first free vector of the second null space.

S243: obtaining a second optimized driving parameter in the second null space by substituting the first to-be-recursed driving parameter into a first associative relationship expression corresponding to the sole control requirement(s), the joint torque inequality, and a sole force parameter inequality group corresponding to the sole force parameter distribution constraint in the second null space.

In this embodiment, the first associative relationship expression is used to represent the correlation between the to-be-optimized driving parameter and the desired state parameter (i.e., the desired acceleration) of the sole, and the first associative relationship expression may be expressed using an equation of:

$$J_F \ddot{q} + \dot{J}_F \dot{q} = a_{F,d};$$

where, $J_F$ represents a Jacobian matrix of the sole of the humanoid robot, $\dot{J}_F$ represents a derivative of the Jacobian matrix of the sole of the humanoid robot, $\dot{q}$ represents an angular velocity of each joint in the current motion status of the humanoid robot, $\ddot{q}$ represents an angular acceleration of each joint that is included in the to-be-optimized driving parameter, and $a_{F,d}$ represents the desired acceleration of the sole.

The sole force parameter inequality group corresponding to the sole force parameter distribution constraint is used to describe the distribution of the sole force vector of the humanoid robot when no sliding occurs and that of the sole force vector of the humanoid robot when no rotation occurs. At this time, the sole force parameter inequality group may be expressed using equations of:

$$\begin{cases} |F_x| \le \frac{\sqrt{2}}{2}\mu F_z \\ |F_y| \le \frac{\sqrt{2}}{2}\mu F_z \\ F_z \ge 0 \\ d_{x,min} \le \frac{-\tau_y}{F_z} \le d_{x,max} \\ d_{y,min} \le \frac{\tau_x}{F_z} \le d_{y,max} \end{cases} ;$$

where, $F_z$ represents a component of a sole force vector in a sole force parameter included in the to-be-optimized driving parameter in a Z-axis direction of a Cartesian coordinate system, $F_x$ represents a component of the sole force vector in the sole force parameter included in the to-be-optimized driving parameter in an X-axis direction of the Cartesian coordinate system, $F_y$ represents a component of the sole force vector in the sole force parameter included in the to-be-optimized driving parameter in a Y-axis direction of the Cartesian coordinate system, $\tau_y$ represents a component of a sole torque vector in the sole force parameter included in the to-be-optimized driving parameter in the Y-axis direction of the Cartesian coordinate system, $\tau_x$ represents a component of a sole torque vector in the sole force parameter included in the to-be-optimized driving parameter in the X-axis direction of the Cartesian coordinate system, $d_{x,min}$ represents a lower limit of a sole supporting area in the X-axis direction of the Cartesian coordinate system, $d_{x,max}$ represents an upper limit of the sole supporting area in the X-axis direction of the Cartesian coordinate system, $d_{y,min}$ represents a lower limit of a sole supporting area in the Y-axis direction of the Cartesian coordinate system, $d_{y,max}$ represents an upper limit of the sole supporting area in the Y-axis direction of the Cartesian coordinate system, and $\mu$ represents a friction coefficient between the sole of the humanoid robot and a supporting surface of the sole.

At this time, the robot controller 10 may substitute the current motion status and the first to-be-recursed driving parameter into the first associative relationship expression, the joint torque inequality, and the sole force parameter inequality group within the second null space of the sole control requirement(s) that represents the second priority, then construct the corresponding QP problem with reference to the standard form of the convex quadratic programming problem for these three equations, and then solve the QP problem in the second null space, so as to perform the secondary optimization processing of the to-be-optimized driving parameter on the basis of not destroying the control task corresponding to the first null space, thereby obtaining the second optimized driving parameter at the second null space that meets the robot dynamics requirement, all of the force control parameter distribution constraint(s) and a part of the sole control requirement(s).

In this process, the QP problem constructed in the second null space may be expressed using equations of:

$$\min_{x_2, v_2} \; \|A_2 x_2 - b_2\|^2 + \|v_2\|^2$$
$$\text{s.t.} \; \begin{array}{l} D_2 x_2 - f_2 \le v_2 \\ D_1 x_2 - f_1 \le v_1^* \end{array} ;$$

where, $v^*_1$ represents an optimized slack variable solved for the QP problem corresponding to the first null space, $x_2$ represents the first to-be-recursed driving parameter corresponding to the to-be-optimized driving parameter in the second null space, $v_2$ represents a slack variable in the second null space, $A_2$ represents a first task coefficient matrix of a control task corresponding to the second null space, $b_2$ represents a second task of the control task corresponding to the second null space, $D_2$ represents a first bias influence coefficient of the sole force parameter inequality group in the QP problem, and $f_2$ represent a second bias influence coefficient of the sole force parameter inequality group in the QP problem.

S244: calculating a second to-be-recursed driving parameter of the third null space based on a null space projection matrix of the second null space, a second free vector of the third null space, and the second optimized driving parameter.

In this embodiment, the parameter association of the second to-be-recursed driving parameter of the third null space with the null space projection matrix of the second null space, the second free vector of the third null space, and the second optimized driving parameter may be expressed using an equation of:

$$x_3 = x^*_2 + N_2 u_3;$$

where, $x_3$ represents the second to-be-recursed driving parameter in the third null space, $N_2$ represents the null space projection matrix of the second null space, $x^*_2$ represents the second optimized driving parameter, $u_3$ represents the second free vector of the third null space.

S245: obtaining a third optimized driving parameter in the third null space by substituting the second to-be-to-be-recursed driving parameter into a second associative relationship expression corresponding to the centroid control requirement, the joint torque inequality, and the sole force parameter inequality group to perform a second convex quadratic programming problem solving in the third null space.

In this embodiment, the second relationship expression is used to represent the associative relationship between the to-be-optimized driving parameter and the desired state parameter (i.e., the desired linear power) of the centroid. The second associative relationship expression may be expressed using an equation of:

$$\dot{h}_{l,d} = A_{G,l}\ddot{q} + \dot{A}_{G,l}\dot{q};$$

where, $A_{G,l}$ represents a momentum matrix corresponding to the centroid of the humanoid robot, $\dot{A}_{G,l}$ represents the derivative of the momentum matrix corresponding to the centroid of the humanoid robot, $\dot{q}$ represents a angular velocity of each joint in the current motion status of the humanoid robot, $\ddot{q}$ represents an angular acceleration of each joint that is included in the to-be-optimized driving parameter, and $\dot{h}_{l,d}$ represents the desired linear power force of the centroid.

At this time, the robot controller 10 may substitute the current motion status and the second to-be-recursed driving parameter into the second associative relationship expression within the third null space of the centroid control requirement that represents the third priority, then construct the corresponding QP problem with reference to the standard form of the convex quadratic programming problem for these three equations, and then solve the QP problem in the third null space, so as to perform the third optimization processing of the to-be-optimized driving parameter on the basis of not destroying the control task corresponding to each of the first null space and the second null space, thereby obtaining the third optimized driving parameter at the third null space that meets the robot dynamics requirement, the centroid control requirement, all of the force control parameter distribution constraint(s) and a part of the sole control requirement(s).

In this process, the QP problem constructed in the third null space may be expressed using equations of:

$$\min_{x_3, v_3} \ \|A_3 x_3 - b_3\|^2 + \|v_3\|^2$$
$$\text{s.t.} \quad \begin{matrix} D_2 x_3 - f_2 \leq v_2^* \\ D_1 x_3 - f_1 \leq v_1^* \end{matrix} ;$$

where, $v^*_2$ represents an optimized slack variable solved for the QP problem corresponding to the first null space, $x_3$ represents the second to-be-recursed driving parameter corresponding to the to-be-optimized driving parameter in the third null space, $v_3$ represents a slack variable in the third null space, $A_3$ represent a first task coefficient matrix of a control task corresponding to the third null space, and $b_3$ represents a second task coefficient matrix of the control task corresponding to the third null space.

S246: calculating a first to-be-recursed driving parameter of a second null space based on a null space projection matrix of the first null space, a first free vector of the second null space, and the first optimized driving parameter.

In this embodiment, the parameter association of the third to-be-recursed driving parameter of the fourth null space with the null space projection matrix of the third null space, the third free vector of the fourth null space, and the third optimized driving parameter may be expressed using an equation of:

$$x_4 = x^*_3 + N_3 u_4;$$

where, $x_4$ represents the third to-be-to-be-recursed driving parameter in the fourth null space, $N_3$ represents the null space projection matrix of the third null space, $x^*_3$ represents the third optimized driving parameter, and $u_4$ represents the third free vector of the fourth null space.

S247: obtaining a to-be-outputted driving parameter capable of being used as the desired driving parameter in the fourth null space by substituting the third to-be-to-be-recursed driving parameter into a third associative relationship expression corresponding to the waist control requirement, a desired sole force parameter trend equation corresponding to the sole control requirement(s), the joint torque inequality, and the sole force parameter inequality group to perform a third convex quadratic programming problem solving in the fourth null space.

In this embodiment, the third associative relationship expression is used to represent the correlation between the to-be-optimized driving parameter and the desired state parameter (i.e., the desired acceleration) of the waist, and the third associative relationship expression may be expressed using an equation of:

$$J_T \ddot{q} + \dot{J}_T \dot{q} = a_{T,d};$$

where, $J_T$ represent a Jacobian matrix of the waist of the humanoid robot, $\dot{J}_T$ represents the derivative of the Jacobian matrix of the waist of the humanoid robot, $\dot{q}$ represents an angular velocity of each joint in the current motion status of the humanoid robot, $\ddot{q}$ represents an angular acceleration of each joint that is included in the to-be-optimized driving parameter, and $a_{T,d}$ represents the desired acceleration of the waist.

The desired sole force parameter trend equation corresponding to the sole control requirement(s) is used to make the sole force parameter included in the to-be-optimized driving parameter reach the desired sole force parameter. At this time, the desired sole force parameter trend equation may be expressed using an equation of:

$$\begin{cases} F_L = F_{L,ref} \\ F_R = F_{R,ref} \end{cases};$$

where, $F_L$ represents the sole force parameter of the left foot of the humanoid robot that is included in the to-be-optimized driving parameters, $F_{L,ref}$ represents the desired sole force parameter of the left foot of the humanoid robot, $F_R$ represents the sole force parameter of the right foot of the humanoid robot that is included in the to-be-optimized driving parameters, and $F_{R,ref}$ represent the desired sole force parameter of the right foot of the humanoid robot.

At this time, the robot controller 10 may substitute the current motion status and the third to-be-recursed driving parameter into the third associative relationship expression, the desired sole force parameter trend equation, the joint torque inequality, and the sole force parameter inequality group within the fourth null space of the centroid control requirement that represents the lowest priority, then construct the corresponding QP problem with reference to the standard form of the convex quadratic programming problem for these four equations, and then solve the QP problem in the fourth null space, so as to perform the fourth optimization processing of the to-be-optimized driving parameter on the basis of not destroying the control task corresponding to each of the first null space, the second null space, and the third null space, thereby obtaining the to-be-outputted driving parameter at the fourth null space that meets the robot dynamics requirement, the centroid control requirement, all of the force control parameter distribution constraint(s), the waist control requirement, and all of the sole control requirement(s).

In this process, the QP problem constructed in the fourth null space may be expressed using equations of:

$$\min_{x_4, v_4} \ \|A_4 x_4 - b_4\|^2 + \|v_4\|^2$$
$$\text{s.t.} \quad \begin{matrix} D_2 x_4 - f_2 \leq v_2^* \\ D_1 x_4 - f_1 \leq v_1^* \end{matrix} ;$$

where, $x_4$ represents the third to-be-recursed driving parameter corresponding to the to-be-optimized driving parameter in the fourth null space, $v_4$ represents a slack variable in the fourth null space, $A_4$ represents a first task coefficient matrix of a control task corresponding to the fourth null space, and $b_4$ represents a second task coefficient matrix of the control task corresponding to the fourth null space.

Therefore, the present disclosure can calculate the desired driving parameter for ensuring the body motion of the humanoid robot to realize the desired motion balance effect and conform to the robot motion laws by executing the above-mentioned sub-steps S241-S247.

FIG. 6 is a flow chart of the second example of sub-steps of step S240 of the method of FIG. 2. As shown in FIG. 6, in this embodiment, the step S240 may further include sub-steps S248 and S249 that are executed after the above-mentioned sub-steps S241-S247 so as to further improve the operation safety of the humanoid robot.

S248: using the obtained to-be-outputted driving parameter in the fourth null space as the desired driving parameter, in response to the convex quadratic programming problem solving corresponding to each of the first null space, the second null space, the third null space, and the fourth null space being all performed successfully and a total time consuming of the convex quadratic programming problem solving corresponding to the first null space, the second null space, the third null space, and the fourth null space being less than a duration of the current control cycle.

S249: using a used driving parameter corresponding to a previous control cycle of the current control cycle as the desired driving parameter, in response to the convex quadratic programming problem solving corresponding to any of the first null space, the second null space, the third null space and the fourth null space being performed failed or the total time consuming of the convex quadratic programming problem solving corresponding to the first null space, the second null space, the third null space, and the fourth null space being greater than the duration of the current control cycle.

Therefore, the present disclosure can further improve the operation safety of the humanoid robot by performing the above-mentioned sub-steps S248-S249.

S250: controlling, based on the desired driving parameter, an operation state of each joint of the humanoid robot such that the humanoid robot maintains a balance according to the desired motion trajectory.

In this embodiment, after determining the desired driving parameter that currently meet the robot dynamics requirement, the foot control requirements, the centroid control requirement, the waist control requirement, and the force control parameter distribution constraint(s), the robot controller 10 may extract the desired angular acceleration of each joint of the humanoid robot and the desired sole force parameters of the feet of the humanoid robot from the desired driving parameter, then solve the current desired joint torque of the humanoid robot by substituting the desired angular acceleration of each joint of the humanoid robot and the desired sole force parameters of the feet of the robot are into a desired joint torque calculation equation, and then transmit the desired joint torque to a force control motor of each joint of the humanoid robot so as to control the humanoid robot to maintain balance according to the desired motion trajectory and achieve the desired motion balance effect. In which, the desired joint torque calculation equation may be expressed using an equation of:

$$\tau_d = S_a M \ddot{q}_d + S_a(C+G) - S_a J^T F_d;$$

where, $\ddot{q}_d$ represents the desired angular acceleration of each joint of the humanoid robot in the desired driving parameters, $F_d$ represents the desired sole force parameter of the humanoid robot feet in the desired driving parameter, and $\tau_d$ represents the current desired joint torque of the humanoid robot.

Therefore, the present disclosure can correct the planned robot motion trajectory in real-time according to the real motion status of the robot, and ensure that the body motion of the humanoid robot can achieve the desired motion balance effect while complying with the robot motion laws so as to improve the operation safety of the robot by executing the above-mentioned steps S210-S250.

In the present disclosure, to ensure that the robot controller 10 can execute the above-mentioned robot balance control method through the robot balance control apparatus 100, the present disclosure implements the forgoing functions by dividing the robot balance control apparatus 100 into functional modules. The composition of the robot balance control apparatus 100 provided by the present disclosure will be correspondingly described below.

Figure 7:
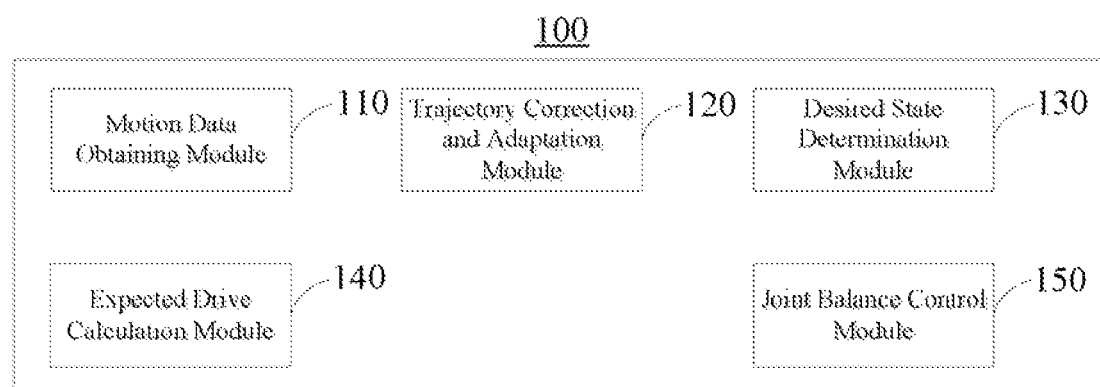
FIG. 7 is a schematic block diagram of the composition of a robot balance control apparatus.

FIG. 7 is a schematic block diagram of the composition of a robot balance control apparatus. In this embodiment, the robot balance control apparatus 100 may include a motion data obtaining module 110, a trajectory correction and adaptation module 120, a desired state determination module 130, an expected drive calculation module 140, and a joint balance control module 150.

The motion data obtaining module 110 is configured to obtain a motion status and a planned motion trajectory of a humanoid robot at a current moment. In which, the motion data obtaining module 110 may correspondingly execute the above-mentioned step S210.

The trajectory correction and adaptation module 120 is configured to obtain a desired motion trajectory matching the motion status by performing a parameter adaptation adjustment on the planned motion trajectory according to the motion status. In which, the trajectory correction and adaptation module 120 may correspondingly execute the above-mentioned step S220 and sub-steps S221-S228.

The desired state determination module 130 is configured to determine, according to the motion status, a desired state parameter of a sole of each of two feet of the humanoid robot, a centroid, and a waist of the humanoid robot for conforming to the desired motion trajectory. In which, the desired state determination module 130 may correspondingly execute the above-mentioned step S230 and sub-steps S231-S233.

The expected drive calculation module 140 is configured to calculate, based on the motion status and the desired state parameter of the sole of each of the two feet, the centroid, and the waist of the humanoid robot, a desired driving parameter of the humanoid robot for simultaneously meeting a robot dynamics requirement, sole control requirement(s), a centroid control requirement, a waist control requirement, and force control parameter distribution constraint(s) at the current moment. In which, the expected drive calculation module 140 may correspondingly execute the above-mentioned step S240 and sub-steps S241-S249.

The joint balance control module 150 is configured to control, based on the desired driving parameter, an operation state of each joint of the humanoid robot such that the humanoid robot maintains a balance according to the desired motion trajectory. In which, the joint balance control module 150 may correspondingly execute the above-mentioned step S250.

It should be noted that, in this embodiment, the basic principles and technical effects of the robot balance control apparatus 100 are the same as that of the above-mentioned robot balance control method. For a brief description, for the parts not mentioned in this embodiment, reference may be made to the forgoing description of the robot balance control method.

In the embodiments provided in the present disclosure, it should be understood that the disclosed apparatus (device) and method may also be implemented in other manners. The device embodiments described above are merely illustrative, for example, the flowcharts and block diagrams in the drawings illustrate the architecture, functionality and operation that are possible to be implemented according to the apparatus, methods and computer program products of the embodiments of the present disclosure. In this regard, each block in the flowchart or block diagram may represent a module, program segment, or a part of codes that contains one or more executable instructions for implementing the specified logical function(s). It should also be noted that, in some alternative implementations, the functions denoted in the block may occur out of the order noted in the figures. For example, two blocks in succession may, in fact, be executed substantially concurrently, or the blocks may sometimes be executed in the reverse order, depending upon the functionality involved. It should also be noted that each block in the block diagrams and/or flowchart and combinations of the blocks in the block diagrams and/or flowchart may be implemented in a dedicated hardware-based system that perform the specified functions or actions, or be implemented in a combination of dedicated hardware and computer instructions.

In addition, each functional module in each embodiment of the present disclosure may be integrated together to form an independent part, or each module may exist independently, or two or more modules may be integrated to form an independent part. If the function(s) are implemented in the form of software functional modules and sold or used as independent products, they may be stored in a readable storage medium. Based on this understanding, the essential parts of the technical solution of the present disclosure or the parts that contribute to the prior art, or a part of the technical solution may be embodied in the form of software products. The computer software product is stored in a computer readable storage medium including a certain number of instructions to cause a computer device (e.g., a personal computer, a server, and a network device) to execute all or part of the steps of the methods described in each embodiment of the present disclosure. The above-mentioned computer readable storage medium may include a USB disk, a mobile hard disk, a read-only memory (ROM), a random access memory (RAM), a magnetic disk, and an optical disk which is capable of storing program codes.

In summary, in the robot balance control method, the robot controller, and the computer readable storage medium provided by the present disclosure, by performing the parameter adaptation adjustment on the planned motion trajectory to obtain the desired motion trajectory matching the motion status after obtaining the current motion status and planned motion trajectory, determining, according to the motion status, the desired state parameter of each of the soles, the centroid, and the waist of the humanoid robot for conforming to the desired motion trajectory, calculating, based on the motion status and the desired state parameter of each of the soles, the centroid, and the waist of the humanoid robot, the desired driving parameter of the humanoid robot for simultaneously meeting the robot dynamics requirement, the sole control requirement(s), the centroid control requirement, the waist control requirement, and control parameter distribution constraint(s) at the current moment, and controlling, based on the obtained desired driving parameter, the operation status of each joint in the humanoid robot. As a result, on the basis of performing real-time correction on the planned motion trajectory of the robot according to the real motion status of the robot to reduce the interference of the environment at which the robot is located on the motion balance of the humanoid robot, it ensure that the body motion of the humanoid robot can achieve the desired motion balance effect while complying with the robot motion laws so as to improve the operation safety of the robot.

The forgoing are only various embodiments of the present disclosure, and the protection scope of the present disclosure is not limited thereto. Any change or substitution that can be easily thought of by those skilled in the art within the technical scope disclosed in the present disclosure shall be covered within the protection scope of protection of the present disclosure. Therefore, the protection scope of the present disclosure shall be subject to the protection scope of the claims.

What is claimed is:

1. A computer-implemented balance control method for a humanoid robot including a waist and two feet each having a sole, comprising:

obtaining a motion status and a planned motion trajectory of the humanoid robot at a current moment;

obtaining a desired motion trajectory matching the motion status by performing a parameter adjustment on the planned motion trajectory according to the motion status;

determining, according to the motion status, a desired state parameter of the sole of each of the two feet, a centroid, and the waist of the humanoid robot for conforming to the desired motion trajectory;

calculating, based on the motion status and the desired state parameter of the sole of each of the two feet, the centroid, and the waist of the humanoid robot, a desired driving parameter of the humanoid robot for simultaneously meeting a robot dynamics requirement, a sole control requirement, a centroid control requirement, a waist control requirement, and a force control parameter distribution constraint at the current moment; and controlling, based on the desired driving parameter, each joint of the humanoid robot such that the humanoid robot maintains a balance according to the desired motion trajectory;

wherein the force control parameter distribution constraints comprise a joint torque distribution constraint and a sole force parameter distribution constraint; and the calculating, based on the motion status and the desired state parameter of the sole of each of the two feet, the centroid, and the waist of the humanoid robot, the desired driving parameter of the humanoid robot for simultaneously meeting the robot dynamics requirement, the sole control requirement, the centroid control requirement, the waist control requirement, and the force control parameter distribution constraint at the current moment comprises:

obtaining a first optimized driving parameter in a first null space by substituting the motion status into a floating base dynamics equation corresponding to the robot dynamics requirement and a joint torque inequality corresponding to the joint torque distribution constraint condition in the first null space to perform a first convex quadratic programming problem solving on a to-be-optimized driving parameter;

calculating a first to-be-recursed driving parameter of a second null space based on a null space projection matrix of the first null space, a first free vector of the second null space, and the first optimized driving parameter;

obtaining a second optimized driving parameter in the second null space by substituting the first to-be-recursed driving parameter into a first associative relationship expression corresponding to the sole control requirement, the joint torque inequality, and a sole force parameter inequality group corresponding to the sole force parameter distribution constraint in the second null space, wherein the first associative relationship expression represents a first associative relationship between the to-be-optimized driving parameter and the desired state parameter of the sole;

calculating a second to-be-recursed driving parameter of the third null space based on a null space projection matrix of the second null space, a second free vector of the third null space, and the second optimized driving parameter;

obtaining a third optimized driving parameter in the third null space by substituting the second to-be-to-be-recursed driving parameter into a second associative relationship expression corresponding to the centroid control requirement, the joint torque inequality, and the sole force parameter inequality group to perform a second convex quadratic programming problem solving in the third null space, wherein the second associative relationship expression represents a second associative relationship between the to-be-optimized driving parameter and the desired state parameter of the centroid;

calculating a third to-be-recursed driving parameter of the fourth null space based on a null space projection matrix of the third null space, a third free vector of a fourth null space, and the third optimized driving parameter; and obtaining a to-be-outputted driving parameter in the fourth null space by substituting the third to-be-to-be-recursed driving parameter into a third associative relationship expression corresponding to the waist control requirement, a desired sole force parameter trend equation corresponding to the sole control requirement, the joint torque inequality, and the sole force parameter inequality group to perform a third convex quadratic programming problem solving in the fourth null space, wherein the third associative relationship expression represents a third associative relationship between the to-be-optimized driving parameter and the desired state parameter of the waist.

2. The method of claim 1, wherein the obtaining the desired motion trajectory matching the motion status by performing the parameter adjustment on the planned motion trajectory according to the motion status comprises:

calculating a zero torque point position of each of the two feet of the humanoid robot based on a sole force of the two feet in the motion status at the current moment;

determining whether the zero torque point position of each of the two feet of the humanoid robot is within a range of a sole supporting area of the corresponding foot;

for the foot of the humanoid robot having the zero torque point position within the range of the sole supporting area of the corresponding foot, obtaining a desired sole pose and a desired sole speed in the desired motion trajectory by performing a matching replacement on a planned sole pose and a planned sole speed in the planned motion trajectory using a sole pose and a sole speed in the motion status that correspond to the foot;

for the foot of the humanoid robot having the zero torque point position not within the range of the sole supporting area of the corresponding foot, taking the planned sole pose of the foot in the planned motion trajectory as the desired sole pose of the foot in the desired motion trajectory and the planned sole speed of the foot in the planned motion trajectory as the desired sole speed of the foot in the desired motion trajectory;

obtaining a desired centroid pose in the desired motion trajectory by performing parameter updating on a planned centroid pose in the planned motion trajectory using the desired sole pose of the feet of the humanoid robot;

obtaining a desired centroid speed in the desired motion trajectory by performing parameter updating on a planned centroid speed in the planned motion trajectory using the desired sole speed of the feet of the humanoid robot;

obtaining a desired waist pose and a desired waist speed in the desired motion trajectory by setting a planned waist pose and a planned waist speed in the planned motion trajectory to zero; and obtaining a desired sole force parameter of each of the two feet in the desired motion trajectory by performing parameter updating on a planned sole force parameter of each of the two feet in the planned motion trajectory using a gravity of the humanoid robot.

3. The method of claim 2, wherein the desired state parameter includes a desired sole acceleration, a desired linear power of the centroid, and a desired acceleration of the waist, and the planned motion trajectory includes a planned state parameter of each of the sole, the centroid, and the waist, the planned state parameter includes a planned acceleration of the sole, a planned linear power of the centroid, and a planned waist acceleration, and the motion status includes an actual pose and an actual speed of each of the sole, the centroid, and the waist; and the determining, according to the motion status, the desired state parameter of the sole of each of the two feet, the centroid, and the waist of the humanoid robot for conforming to the desired motion trajectory comprises:

for each balance demanding part among the sole, the centroid, and the waist, obtaining a pose difference by performing subtraction operation on a desired pose of the balance demanding part and the actual pose of the balance demanding part and obtaining a speed difference by performing subtraction operation on a desired speed of the balance demanding part and the actual speed of the balance demanding part;

for each balance demanding part among the sole, the centroid, and the waist, selecting a difference parameter matching a motion control function of the balance demanding part from the obtained pose difference and speed difference; and for each balance demanding part among the sole, the centroid, and the waist, calculating the desired state parameter of the balance demanding part by substituting the planned state parameter corresponding to the balance demanding part and the selected difference parameter into the motion control function of the balance demanding part.

4. The method of claim 1, wherein the calculating, based on the motion status and the desired state parameter of the sole of each of the two feet, the centroid, and the waist of the humanoid robot, the desired driving parameter of the humanoid robot for simultaneously meeting the robot dynamics requirement, the sole control requirement, the centroid control requirement, the waist control requirement, and the force control parameter distribution constraints at the current moment comprises:

using the obtained to-be-outputted driving parameter in the fourth null space as the desired driving parameter, in response to the convex quadratic programming problem solving corresponding to each of the first null space, the second null space, the third null space, and the fourth null space being all performed successfully and a total time consuming of the convex quadratic programming problem solving corresponding to the first null space, the second null space, the third null space, and the fourth null space being less than a duration of the current control cycle; and using a used driving parameter corresponding to a previous control cycle of the current control cycle as the desired driving parameter, in response to the convex quadratic programming problem solving corresponding to any of the first null space, the second null space, the third null space and the fourth null space being performed failed or the total time consuming of the convex quadratic programming problem solving corresponding to the first null space, the second null space, the third null space, and the fourth null space being greater than the duration of the current control cycle.

5. The method of claim 1, wherein the joint torque inequality is:

$$[\tau_{min}-S_a(C+G)] \leq S_a M\ddot{q}-S_a J^T F \leq [\tau_{max}-S_a(C+G)];$$

where, $\tau_{min}$ represents a lower limit of a joint torque of the humanoid robot, Imax represents a upper limit of the joint torque of the humanoid robot, Sa represents a drivable joint selection matrix of the humanoid robot, M represents a current inertia matrix of the humanoid robot, G represents a current gravity matrix of the humanoid robot, C represents a current nonlinear matrix of the humanoid robot that is generated by centrifugal force and Coriolis force, J represents a Jacobian matrix of a current sole force acting point of the humanoid robot, $\ddot{q}$ represents an angular acceleration of each joint that is included in the to-be-optimized driving parameter, and F represent a sole force parameter included in the to-be-optimized driving parameter.

6. The method of claim 1, wherein the sole force parameter inequality group is expressed using equations of:

$$\begin{cases} |F_x| \leq \frac{\sqrt{2}}{2}\mu F_z \\ |F_y| \leq \frac{\sqrt{2}}{2}\mu F_z \\ F_z \geq 0 \\ d_{x,min} \leq \frac{-\tau_y}{F_z} \leq d_{x,max} \\ d_{y,min} \leq \frac{\tau_x}{F_z} \leq d_{y,max} \end{cases} ;$$

where, $F_z$ represents a component of a sole force vector in a sole force parameter included in the to-be-optimized driving parameter in a Z-axis direction of a Cartesian coordinate system, $F_x$ represents a component of the sole force vector in the sole force parameter included in the to-be-optimized driving parameter in an X-axis direction of the Cartesian coordinate system, $F_y$ represents a component of the sole force vector in the sole force parameter included in the to-be-optimized driving parameter in a Y-axis direction of the Cartesian coordinate system, $\tau_y$ represents a component of a sole torque vector in the sole force parameter included in the to-be-optimized driving parameter in the Y-axis direction of the Cartesian coordinate system, $\tau_x$ represents a component of a sole torque vector in the sole force parameter included in the to-be-optimized driving parameter in the X-axis direction of the Cartesian coordinate system, $d_{x,min}$ represents a lower limit of a sole supporting area of the foot of the humanoid robot in the X-axis direction of the Cartesian coordinate system, $d_{x,max}$ represents an upper limit of the sole supporting area in the X-axis direction of the Cartesian coordinate system, $d_{y,min}$ represents a lower limit of the sole supporting area in the Y-axis direction of the Cartesian coordinate system, $d_{y,max}$ represents an upper limit of the sole supporting area in the Y-axis direction of the Cartesian coordinate system, and μ represents a friction coefficient between the sole of the humanoid robot and a supporting surface of the sole.

7. A controller for a humanoid robot including a waist and two feet each having a sole, comprising:

a processor;

a memory coupled to the processor; and one or more computer programs stored in the memory and executable on the processor;

wherein, the one or more computer programs comprise:

instructions for obtaining a motion status and a planned motion trajectory of the humanoid robot at a current moment;

instructions for obtaining a desired motion trajectory matching the motion status by performing a parameter adjustment on the planned motion trajectory according to the motion status;

instructions for determining, according to the motion status, a desired state parameter of the sole of each of the two feet, a centroid, and the waist of the humanoid robot for conforming to the desired motion trajectory;

instructions for calculating, based on the motion status and the desired state parameter of the sole of each of the two feet, the centroid, and the waist of the humanoid robot, a desired driving parameter of the humanoid robot for simultaneously meeting a robot dynamics requirement, a sole control requirement, a centroid control requirement, a waist control requirement, and a force control parameter distribution constraint at the current moment; and instructions for controlling, based on the desired driving parameter, each joint of the humanoid robot such that the humanoid robot maintains a balance according to the desired motion trajectory;

wherein the force control parameter distribution constraints comprise a joint torque distribution constraint and a sole force parameter distribution constraint; and the instructions for calculating, based on the motion status and the desired state parameter of the sole of each of the two feet, the centroid, and the waist of the humanoid robot, the desired driving parameter of the humanoid robot for simultaneously meeting the robot dynamics requirement, the sole control requirement, the centroid control requirement, the waist control requirement, and the force control parameter distribution constraint at the current moment comprise:

instructions for obtaining a first optimized driving parameter in a first null space by substituting the motion status into a floating base dynamics equation corresponding to the robot dynamics requirement and a joint torque inequality corresponding to the joint torque distribution constraint condition in the first null space to perform a first convex quadratic programming problem solving on a to-be-optimized driving parameter;

instructions for calculating a first to-be-recursed driving parameter of a second null space based on a null space projection matrix of the first null space, a first free vector of the second null space, and the first optimized driving parameter;

instructions for obtaining a second optimized driving parameter in the second null space by substituting the first to-be-recursed driving parameter into a first associative relationship expression corresponding to the sole control requirement, the joint torque inequality, and a sole force parameter inequality group corresponding to the sole force parameter distribution constraint in the second null space, wherein the first associative relationship expression represents a first associative relationship between the to-be-optimized driving parameter and the desired state parameter of the sole;

instructions for calculating a second to-be-recursed driving parameter of the third null space based on a null space projection matrix of the second null space, a second free vector of the third null space, and the second optimized driving parameter;

instructions for obtaining a third optimized driving parameter in the third null space by substituting the second to-be-to-be-recursed driving parameter into a second associative relationship expression corresponding to the centroid control requirement, the joint torque inequality, and the sole force parameter inequality group to perform a second convex quadratic programming problem solving in the third null space, wherein the second associative relationship expression represents a second associative relationship between the to-be-optimized driving parameter and the desired state parameter of the centroid;

instructions for calculating a third to-be-recursed driving parameter of the fourth null space based on a null space projection matrix of the third null space, a third free vector of a fourth null space, and the third optimized driving parameter; and instructions for obtaining a to-be-outputted driving parameter in the fourth null space by substituting the third to-be-to-be-recursed driving parameter into a third associative relationship expression corresponding to the waist control requirement, a desired sole force parameter trend equation corresponding to the sole control requirement, the joint torque inequality, and the sole force parameter inequality group to perform a third convex quadratic programming problem solving in the fourth null space, wherein the third associative relationship expression represents a third associative relationship between the to-be-optimized driving parameter and the desired state parameter of the waist.

8. The controller of claim 7, wherein the instructions for obtaining the desired motion trajectory matching the motion status by performing the parameter adjustment on the planned motion trajectory according to the motion status comprise:

instructions for calculating a zero torque point position of each of the two feet of the humanoid robot based on a sole force of the two feet in the motion status at the current moment;

instructions for determining whether the zero torque point position of each of the two feet of the humanoid robot is within a range of a sole supporting area of the corresponding foot;

instructions for, for the foot of the humanoid robot having the zero torque point position within the range of the sole supporting area of the corresponding foot, obtaining a desired sole pose and a desired sole speed in the desired motion trajectory by performing a matching replacement on a planned sole pose and a planned sole speed in the planned motion trajectory using a sole pose and a sole speed in the motion status that correspond to the foot;

instructions for, for the foot of the humanoid robot having the zero torque point position not within the range of the sole supporting area of the corresponding foot, taking the planned sole pose of the foot in the planned motion trajectory as the desired sole pose of the foot in the desired motion trajectory and the planned sole speed of the foot in the planned motion trajectory as the desired sole speed of the foot in the desired motion trajectory;

instructions for obtaining a desired centroid pose in the desired motion trajectory by performing parameter updating on a planned centroid pose in the planned motion trajectory using the desired sole pose of the feet of the humanoid robot;

instructions for obtaining a desired centroid speed in the desired motion trajectory by performing parameter updating on a planned centroid speed in the planned motion trajectory using the desired sole speed of the feet of the humanoid robot;

instructions for obtaining a desired waist pose and a desired waist speed in the desired motion trajectory by setting a planned waist pose and a planned waist speed in the planned motion trajectory to zero; and instructions for obtaining a desired sole force parameter of each of the two feet in the desired motion trajectory by performing parameter updating on a planned sole force parameter of each of the two feet in the planned motion trajectory using a gravity of the humanoid robot.

9. The controller of claim 8, wherein the desired state parameter includes a desired sole acceleration, a desired linear power of the centroid, and a desired acceleration of the waist, and the planned motion trajectory includes a planned state parameter of each of the sole, the centroid, and the waist, the planned state parameter includes a planned acceleration of the sole, a planned linear power of the centroid, and a planned waist acceleration, and the motion status includes an actual pose and an actual speed of each of the sole, the centroid, and the waist; and the instructions for determining, according to the motion status, the desired state parameter of the sole of each of the two feet, the centroid, and the waist of the humanoid robot for conforming to the desired motion trajectory comprise:

instructions for, for each balance demanding part among the sole, the centroid, and the waist, obtaining a pose difference by performing subtraction operation on a desired pose of the balance demanding part and the actual pose of the balance demanding part and obtaining a speed difference by performing subtraction operation on a desired speed of the balance demanding part and the actual speed of the balance demanding part;

instructions for, for each balance demanding part among the sole, the centroid, and the waist, selecting a difference parameter matching a motion control function of the balance demanding part from the obtained pose difference and speed difference; and instructions for, for each balance demanding part among the sole, the centroid, and the waist, calculating the desired state parameter of the balance demanding part by substituting the planned state parameter corresponding to the balance demanding part and the selected difference parameter into the motion control function of the balance demanding part.

10. The controller of claim 7, wherein the instructions for calculating, based on the motion status and the desired state parameter of the sole of each of the two feet, the centroid, and the waist of the humanoid robot, the desired driving parameter of the humanoid robot for simultaneously meeting the robot dynamics requirement, the sole control requirement, the centroid control requirement, the waist control requirement, and the force control parameter distribution constraint at the current moment comprise:

instructions for using the obtained to-be-outputted driving parameter in the fourth null space as the desired driving parameter, in response to the convex quadratic programming problem solving corresponding to each of the first null space, the second null space, the third null space, and the fourth null space being all performed successfully and a total time consuming of the convex quadratic programming problem solving corresponding to the first null space, the second null space, the third null space, and the fourth null space being less than a duration of the current control cycle; and instructions for using a used driving parameter corresponding to a previous control cycle of the current control cycle as the desired driving parameter, in response to the convex quadratic programming problem solving corresponding to any of the first null space, the second null space, the third null space and the fourth null space being performed failed or the total time consuming of the convex quadratic programming problem solving corresponding to the first null space, the second null space, the third null space, and the fourth null space being greater than the duration of the current control cycle.

11. The controller of claim 8, wherein the joint torque inequality is:

$$[\tau_{min}-S_a(C+G)] \leq S_a M\ddot{q}-S_a J^T F \leq [\tau_{max}-S_a(C+G)];$$

where, $\tau_{min}$ represents a lower limit of a joint torque of the humanoid robot, $\tau_{max}$ represents a upper limit of the joint torque of the humanoid robot, $S_a$ represents a drivable joint selection matrix of the humanoid robot, M represents a current inertia matrix of the humanoid robot, G represents a current gravity matrix of the humanoid robot, C represents a current nonlinear matrix of the humanoid robot that is generated by centrifugal force and Coriolis force, J represents a Jacobian matrix of a current sole force acting point of the humanoid robot, $\ddot{q}$ represents an angular acceleration of each joint that is included in the to-be-optimized driving parameter, and F represent a sole force parameter included in the to-be-optimized driving parameter.

12. The controller of claim 7, wherein the sole force parameter inequality group is expressed using equations of:

$$\begin{cases} |F_x| \leq \frac{\sqrt{2}}{2}\mu F_z \\ |F_y| \leq \frac{\sqrt{2}}{2}\mu F_z \\ F_z \geq 0 \\ d_{x,min} \leq \frac{-\tau_y}{F_z} \leq d_{x,max} \\ d_{y,min} \leq \frac{\tau_x}{F_z} \leq d_{y,max} \end{cases} ;$$

where, $F_z$ represents a component of a sole force vector in a sole force parameter included in the to-be-optimized driving parameter in a Z-axis direction of a Cartesian coordinate system, $F_x$ represents a component of the sole force vector in the sole force parameter included in the to-be-optimized driving parameter in an X-axis direction of the Cartesian coordinate system, $F_y$ represents a component of the sole force vector in the sole force parameter included in the to-be-optimized driving parameter in a Y-axis direction of the Cartesian coordinate system, $\tau_y$ represents a component of a sole torque vector in the sole force parameter included in the to-be-optimized driving parameter in the Y-axis direction of the Cartesian coordinate system, $\tau_x$ represents a component of a sole torque vector in the sole force parameter included in the to-be-optimized driving parameter in the X-axis direction of the Cartesian coordinate system, dx, min represents a lower limit of a sole supporting area of the foot of the humanoid robot in the X-axis direction of the Cartesian coordinate system, $d_{x,max}$ represents an upper limit of the sole supporting area in the X-axis direction of the Cartesian coordinate system, $d_{y,min}$ represents a lower limit of the sole supporting area in the Y-axis direction of the Cartesian coordinate system, $d_{y,max}$ represents an upper limit of the sole supporting area in the Y-axis direction of the Cartesian coordinate system, and μ represents a friction coefficient between the sole of the humanoid robot and a supporting surface of the sole.

13. A non-transitory computer readable storage medium for storing one or more computer programs, wherein the one or more computer programs comprise:

instructions for obtaining a motion status and a planned motion trajectory of a humanoid robot including a waist and two feet each having a sole at a current moment;

instructions for obtaining a desired motion trajectory matching the motion status by performing a parameter adjustment on the planned motion trajectory according to the motion status;

instructions for determining, according to the motion status, a desired state parameter of the sole of each of the two feet, a centroid, and the waist of the humanoid robot for conforming to the desired motion trajectory;

instructions for calculating, based on the motion status and the desired state parameter of the sole of each of the two feet, the centroid, and the waist of the humanoid robot, a desired driving parameter of the humanoid robot for simultaneously meeting a robot dynamics requirement, a sole control requirement, a centroid control requirement, a waist control requirement, and a force control parameter distribution constraint at the current moment; and instructions for controlling, based on the desired driving parameter, each joint of the humanoid robot such that the humanoid robot maintains a balance according to the desired motion trajectory;

wherein the force control parameter distribution constraints comprise a joint torque distribution constraint and a sole force parameter distribution constraint; and the instructions for calculating, based on the motion status and the desired state parameter of the sole of each of the two feet, the centroid, and the waist of the humanoid robot, the desired driving parameter of the humanoid robot for simultaneously meeting the robot dynamics requirement, the sole control requirement, the centroid control requirement, the waist control requirement, and the force control parameter distribution constraint at the current moment comprise:

instructions for obtaining a first optimized driving parameter in a first null space by substituting the motion status into a floating base dynamics equation corresponding to the robot dynamics requirement and a joint torque inequality corresponding to the joint torque distribution constraint condition in the first null space to perform a first convex quadratic programming problem solving on a to-be-optimized driving parameter;

instructions for calculating a first to-be-recursed driving parameter of a second null space based on a null space projection matrix of the first null space, a first free vector of the second null space, and the first optimized driving parameter;

instructions for obtaining a second optimized driving parameter in the second null space by substituting the first to-be-recursed driving parameter into a first associative relationship expression corresponding to the sole control requirement, the joint torque inequality, and a sole force parameter inequality group corresponding to the sole force parameter distribution constraint in the second null space, wherein the first associative relationship expression represents a first associative relationship between the to-be-optimized driving parameter and the desired state parameter of the sole;

instructions for calculating a second to-be-recursed driving parameter of the third null space based on a null space projection matrix of the second null space, a second free vector of the third null space, and the second optimized driving parameter;

instructions for obtaining a third optimized driving parameter in the third null space by substituting the second to-be-to-be-recursed driving parameter into a second associative relationship expression corresponding to the centroid control requirement, the joint torque inequality, and the sole force parameter inequality group to perform a second convex quadratic programming problem solving in the third null space, wherein the second associative relationship expression represents a second associative relationship between the to-be-optimized driving parameter and the desired state parameter of the centroid;

instructions for calculating a third to-be-recursed driving parameter of the fourth null space based on a null space projection matrix of the third null space, a third free vector of a fourth null space, and the third optimized driving parameter; and instructions for obtaining a to-be-outputted driving parameter in the fourth null space by substituting the third to-be-to-be-recursed driving parameter into a third associative relationship expression corresponding to the waist control requirement, a desired sole force parameter trend equation corresponding to the sole control requirement, the joint torque inequality, and the sole force parameter inequality group to perform a third convex quadratic programming problem solving in the fourth null space, wherein the third associative relationship expression represents a third associative relationship between the to-be-optimized driving parameter and the desired state parameter of the waist.

14. The storage medium of claim 13, wherein the instructions for obtaining the desired motion trajectory matching the motion status by performing the parameter adjustment on the planned motion trajectory according to the motion status comprise:

instructions for calculating a zero torque point position of each of the two feet of the humanoid robot based on a sole force of the two feet in the motion status at the current moment;

instructions for determining whether the zero torque point position of each of the two feet of the humanoid robot is within a range of a sole supporting area of the corresponding foot;

instructions for, for the foot of the humanoid robot having the zero torque point position within the range of the sole supporting area of the corresponding foot, obtaining a desired sole pose and a desired sole speed in the desired motion trajectory by performing a matching replacement on a planned sole pose and a planned sole speed in the planned motion trajectory using a sole pose and a sole speed in the motion status that correspond to the foot;

instructions for, for the foot of the humanoid robot having the zero torque point position not within the range of the sole supporting area of the corresponding foot, taking the planned sole pose of the foot in the planned motion trajectory as the desired sole pose of the foot in the desired motion trajectory and the planned sole speed of the foot in the planned motion trajectory as the desired sole speed of the foot in the desired motion trajectory;

instructions for obtaining a desired centroid pose in the desired motion trajectory by performing parameter updating on a planned centroid pose in the planned motion trajectory using the desired sole pose of the feet of the humanoid robot;

instructions for obtaining a desired centroid speed in the desired motion trajectory by performing parameter updating on a planned centroid speed in the planned motion trajectory using the desired sole speed of the feet of the humanoid robot;

instructions for obtaining a desired waist pose and a desired waist speed in the desired motion trajectory by setting a planned waist pose and a planned waist speed in the planned motion trajectory to zero; and instructions for obtaining a desired sole force parameter of each of the two feet in the desired motion trajectory by performing parameter updating on a planned sole force parameter of each of the two feet in the planned motion trajectory using a gravity of the humanoid robot.

15. The storage medium of claim 14, wherein the desired state parameter includes a desired sole acceleration, a desired linear power of the centroid, and a desired acceleration of the waist, and the planned motion trajectory includes a planned state parameter of each of the sole, the centroid, and the waist, the planned state parameter includes a planned acceleration of the sole, a planned linear power of the centroid, and a planned waist acceleration, and the motion status includes an actual pose and an actual speed of each of the sole, the centroid, and the waist; and the instructions for determining, according to the motion status, the desired state parameter of the sole of each of the two feet, the centroid, and the waist of the humanoid robot for conforming to the desired motion trajectory comprise:

instructions for, for each balance demanding part among the sole, the centroid, and the waist, obtaining a pose difference by performing subtraction operation on a desired pose of the balance demanding part and the actual pose of the balance demanding part and obtaining a speed difference by performing subtraction operation on a desired speed of the balance demanding part and the actual speed of the balance demanding part;

instructions for, for each balance demanding part among the sole, the centroid, and the waist, selecting a difference parameter matching a motion control function of the balance demanding part from the obtained pose difference and speed difference; and instructions for, for each balance demanding part among the sole, the centroid, and the waist, calculating the desired state parameter of the balance demanding part by substituting the planned state parameter corresponding to the balance demanding part and the selected difference parameter into the motion control function of the balance demanding part.

16. The storage medium of claim 13, wherein the instructions for calculating, based on the motion status and the desired state parameter of the sole of each of the two feet, the centroid, and the waist of the humanoid robot, the desired driving parameter of the humanoid robot for simultaneously meeting the robot dynamics requirement, the sole control requirement, the centroid control requirement, the waist control requirement, and the force control parameter distribution constraint at the current moment comprise:

instructions for using the obtained to-be-outputted driving parameter in the fourth null space as the desired driving parameter, in response to the convex quadratic programming problem solving corresponding to each of the first null space, the second null space, the third null space, and the fourth null space being all performed successfully and a total time consuming of the convex quadratic programming problem solving corresponding to the first null space, the second null space, the third null space, and the fourth null space being less than a duration of the current control cycle; and instructions for using a used driving parameter corresponding to a previous control cycle of the current control cycle as the desired driving parameter, in response to the convex quadratic programming problem solving corresponding to any of the first null space, the second null space, the third null space and the fourth null space being performed failed or the total time consuming of the convex quadratic programming problem solving corresponding to the first null space, the second null space, the third null space, and the fourth null space being greater than the duration of the current control cycle.

17. The storage medium of claim 13, wherein the joint torque inequality is:

$$[\tau_{min} - S_a(C+G)] \leq S_a M \ddot{q} - S_a J^T F \leq [\tau_{max} - S_a(C+G)];$$

where, $\tau_{min}$ represents a lower limit of a joint torque of the humanoid robot, $T_{max}$ represents a upper limit of the joint torque of the humanoid robot, $S_a$ represents a drivable joint selection matrix of the humanoid robot, M represents a current inertia matrix of the humanoid robot, G represents a current gravity matrix of the humanoid robot, C represents a current nonlinear matrix of the humanoid robot that is generated by centrifugal force and Coriolis force, J represents a Jacobian matrix of a current sole force acting point of the humanoid robot, $\ddot{q}$ represents an angular acceleration of each joint that is included in the to-be-optimized driving parameter, and F represent a sole force parameter included in the to-be-optimized driving parameter.

18. The storage medium of claim 13, wherein the sole force parameter inequality group is expressed using equations of:

$$\begin{cases} |F_x| \leq \frac{\sqrt{2}}{2} \mu F_z \\ |F_y| \leq \frac{\sqrt{2}}{2} \mu F_z \\ F_z \geq 0 \\ d_{x,min} \leq \frac{-\tau_y}{F_z} \leq d_{x,max} \\ d_{y,min} \leq \frac{\tau_x}{F_z} \leq d_{y,max} \end{cases} ;$$

where, $F_z$ represents a component of a sole force vector in a sole force parameter included in the to-be-optimized driving parameter in a Z-axis direction of a Cartesian coordinate system, $F_x$ represents a component of the sole force vector in the sole force parameter included in the to-be-optimized driving parameter in an X-axis direction of the Cartesian coordinate system, $F_y$ represents a component of the sole force vector in the sole force parameter included in the to-be-optimized driving parameter in a Y-axis direction of the Cartesian coordinate system, $\tau_y$ represents a component of a sole torque vector in the sole force parameter included in the to-be-optimized driving parameter in the Y-axis direction of the Cartesian coordinate system, $\tau_x$ represents a component of a sole torque vector in the sole force parameter included in the to-be-optimized driving parameter in the X-axis direction of the Cartesian coordinate system, $d_{x,min}$ represents a lower limit of a sole supporting area of the foot of the humanoid robot in the X-axis direction of the Cartesian coordinate system, $d_{x,max}$ represents an upper limit of the sole supporting area in the X-axis direction of the Cartesian coordinate system, $d_{y,min}$ represents a lower limit of the sole supporting area in the Y-axis direction of the Cartesian coordinate system, $d_{y,max}$ represents an upper limit of the sole supporting area in the Y-axis direction of the Cartesian coordinate system, and μ represents a friction coefficient between the sole of the humanoid robot and a supporting surface of the sole.

19. The storage medium of claim 13, wherein the motion status comprises sole forces of the two feet of the humanoid robot, current actual poses and actual speeds of the humanoid robot at the sole, the centroid and the waist, and an actual velocity and an actual angular velocity of the humanoid robot at each joint.

20. The storage medium of claim 13, wherein the desired motion trajectory matching the motion status is obtained by:
analyzing the motion status to determine contact of the two feet of the humanoid robot with a sole supporting plane in environment; and
adjusting the planned motion trajectory based on the contact of the two feet of the humanoid robot with the sole supporting plane.

* * * * *